F. J. HUGHES.
CAR COUPLING.
No. 10,999. Reissued Apr. 30, 1889.
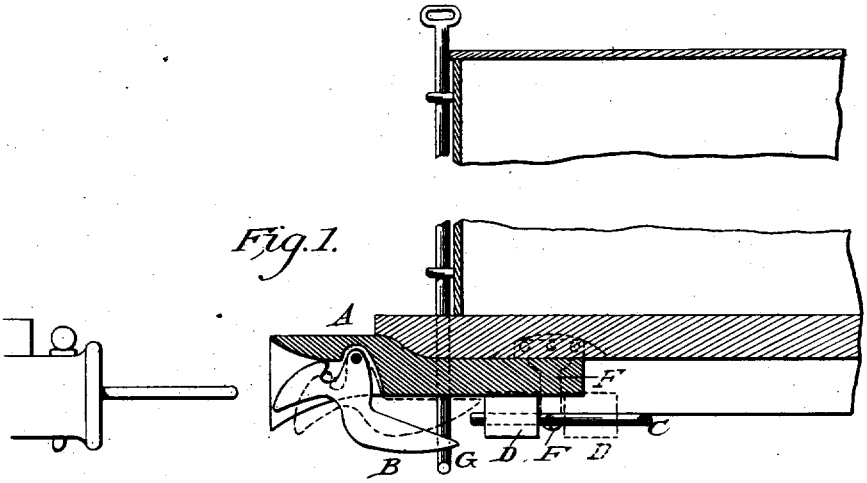
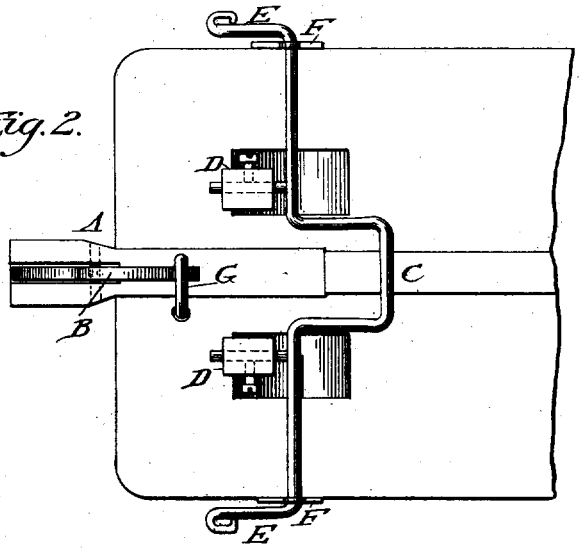
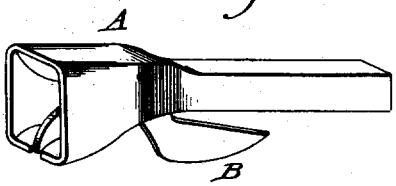
Witnesses.
H. D. Baker
W. Fitzgerald
Inventor.
Frederick John Hughes
N. PETERS, Photo-Lithographer, Washington, D. C.

UNITED STATES PATENT OFFICE.

FREDERICK J. HUGHES, OF WATFORD, ONTARIO, CANADA.

CAR-COUPLING.

SPECIFICATION forming part of Reissued Letters Patent No. 10,999, dated April 30, 1889.

Original No. 397,058, dated January 29, 1889. Application for reissue filed April 6, 1889. Serial No. 306,285.

*To all whom it may concern:*

Be it known that I, FREDERICK JOHN HUGHES, painter, a citizen of the Dominion of Canada, residing at the village of Watford, in the county of Lambton and Province of Ontario, Canada, have invented a certain new and useful Car-Coupler for Coupling Railway-Cars, called "The Hughes Automatic Car-Coupler;" and I hereby declare that the following is a full, clear, and exact description of the invention and in what manner the same is to be performed, viz:

My invention (the Hughes Automatic Car-Coupler) is an automatic car-coupler for coupling railway-cars without the assistance of brakemen, and can be uncoupled from either side or top of the car without brakemen going between the cars. It will also couple on any car with ordinary link-and-bolt coupling without the assistance of brakemen, thus avoiding the danger of going between the cars, and in case of dropping through a bridge it will immediately uncouple and not draw on cars behind or in front. By setting with side cranks it also uncouples without any assistance.

Reference is to be had to the accompanying drawings, forming part of this specification, in which similar letters of reference indicate corresponding parts in all the figures.

Figure 1 is a side view of car with my coupler attached ready to receive link, part of draw-head broken out. Fig. 2 is under view of car with my coupler attached. Fig. 3 is draw-head with dog attached.

A is draw-head with beveled mouth and under-cut to receive counterweighted dog B, the bottom of which acts, in combination with curved hook of said dog, as a link-guide.

B is the dog used in draw-head for coupling and has an inclined curve from point of hook which engages link to the bottom point of front part of dog without any square or other projections used in combination with beveled mouth of draw-head in guiding link to place, the bottom point of said dog coming even with end of draw-head, and the curve on the face of dog projects upward and forward of beveled mouth of link-guide of draw-head about one inch, so as to engage link, thereby springing dog before link comes in contact with beveled mouth or link-guide of draw-head A.

C is bent center of under shaft, which raises dog for uncoupling when weights D D opposite are thrown backward. Said bent center is in no way connected with counterweighted dog B, though working in combination with it.

D D are weights opposite bent center, which are adjustable. Said bent center and weights move in half-circle when uncoupling.

E E are cranks at both ends of under-shaft for turning shaft when uncoupling.

F F are the journals which carry under shaft.

G is an upright rod at end of car, with hand-hold at top, bottom end turned at right angles, which acts on dog when uncoupling from top of car.

In the construction of this coupler neither springs nor loose bolts are used, or other loose apparatus. My draw-head has an under slot for dog to work in, but no opening at top, being solid, thus excluding snow and ice, and is to take the place of the ordinary draw-head without change of draw-timbers or other parts on ordinary freight-car for attaching draw-heads.

Having thus described my invention, what I claim, and desire to secure by Letters Patent, is—

1. The combination of the draw-head A, having a solid top for the exclusion of snow and ice with the counterweighted dog B, having the bottom of its hook below the level of the pivot, so as to permit of an upward pull by the link and an easy disengagement thereof, substantially as shown and described.

2. In combination with dog B, under shaft with cranks E E bent at each end, with bent center C and adjustable weights D D opposite, which move in a half-circle when uncoupling from side of car, and journals F F, which carry said under shaft, as shown and described.

3. In combination with dog B, upright rod G, passing down end of car, with hand-hold at top, with bottom end turned at right angles, which acts on dog for uncoupling from top of car.

4. The combination of the draw-head A, having a beveled mouth or link-guide, and the counterweighted dog B, with inclined curve, as stated above, on the top or part that engages link, with the bottom of its hook below the level of the pivot and coming even with front part of draw-head and projecting upward and forward of beveled mouth of draw-head, substantially as set forth.

F. J. HUGHES.

Witnesses:
J. F. McLEAY,
W. E. FITZGERALD.